W. C. HUEBNER.
ADJUSTMENT INDICATOR AND CONTROLLER.
APPLICATION FILED APR. 7, 1911.
1,170,157.
Patented Feb. 1, 1916.
5 SHEETS—SHEET 1.
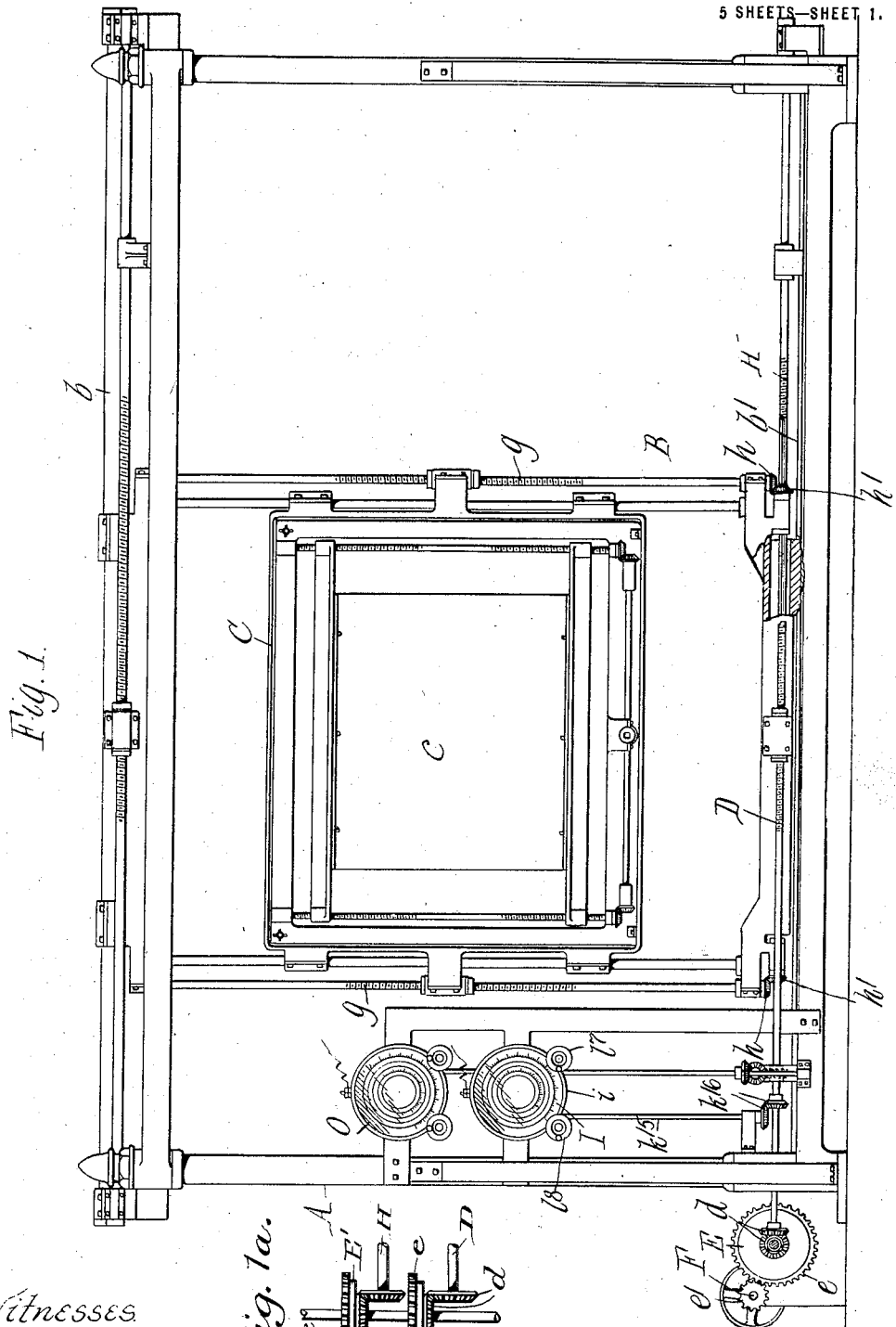
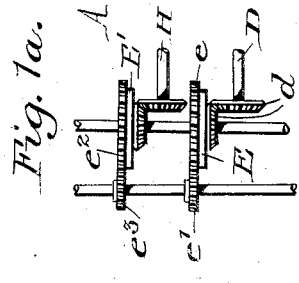
Witnesses
A. G. Dimond
C. E. Easterbrooks
Inventor:
William C. Huebner
By Wilhelm, Parker & Hard
Attorneys.

W. C. HUEBNER.
ADJUSTMENT INDICATOR AND CONTROLLER.
APPLICATION FILED APR. 7, 1911.
1,170,157.
Patented Feb. 1, 1916.
5 SHEETS—SHEET 2.
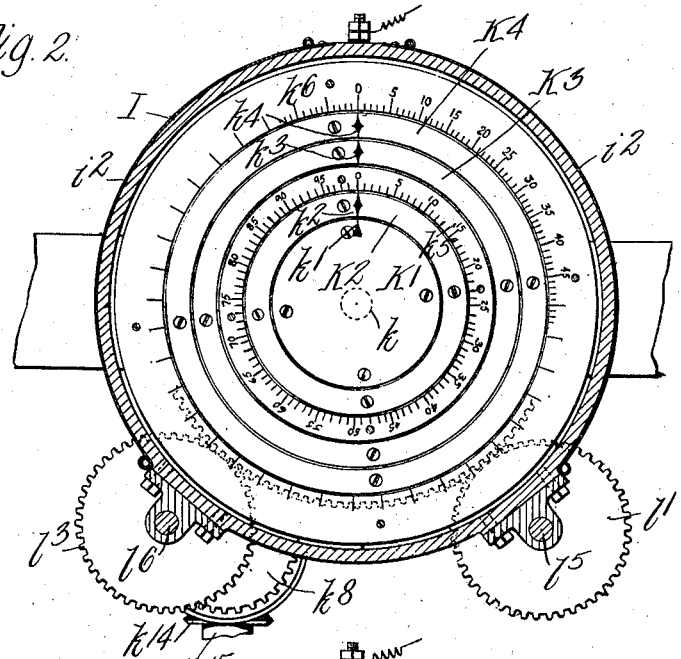
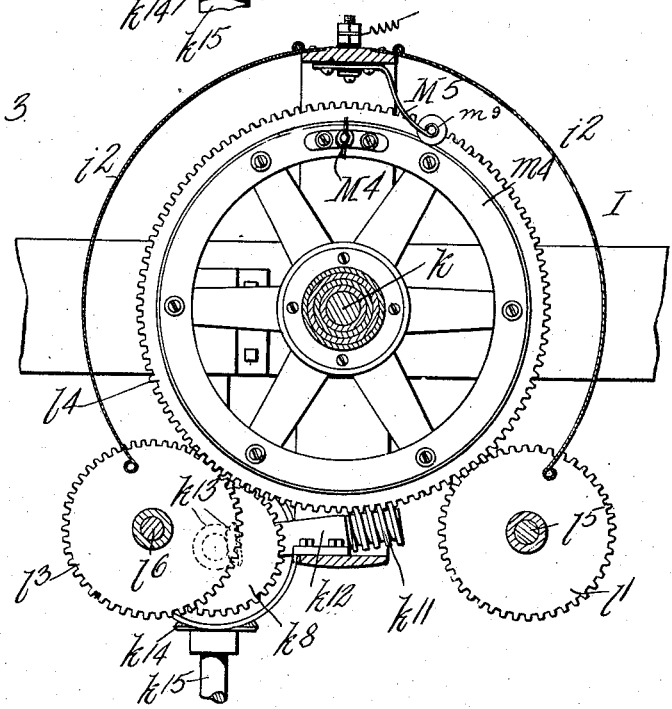

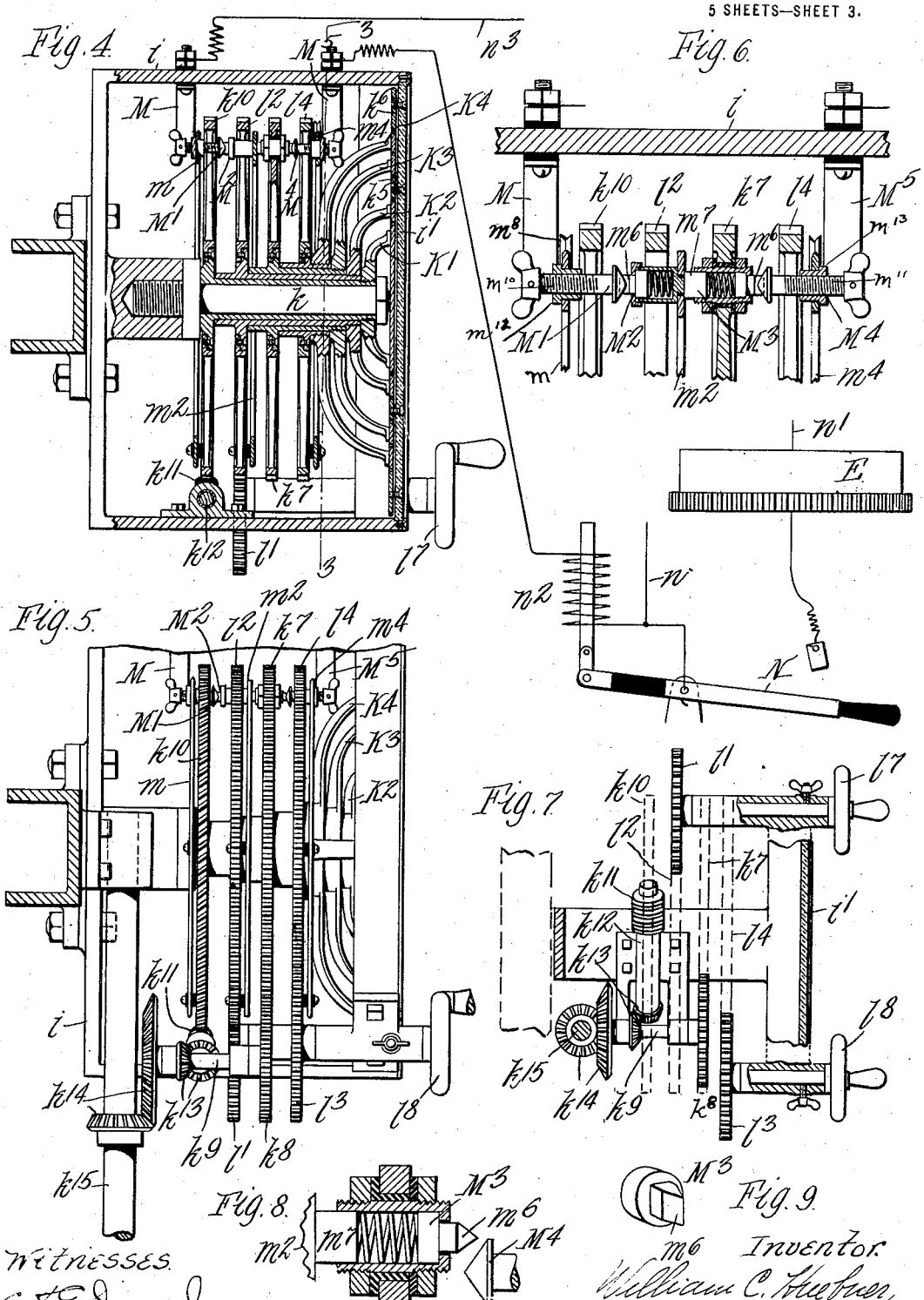

W. C. HUEBNER.
ADJUSTMENT INDICATOR AND CONTROLLER.
APPLICATION FILED APR. 7, 1911.
1,170,157.
Patented Feb. 1, 1916.
5 SHEETS—SHEET 4.
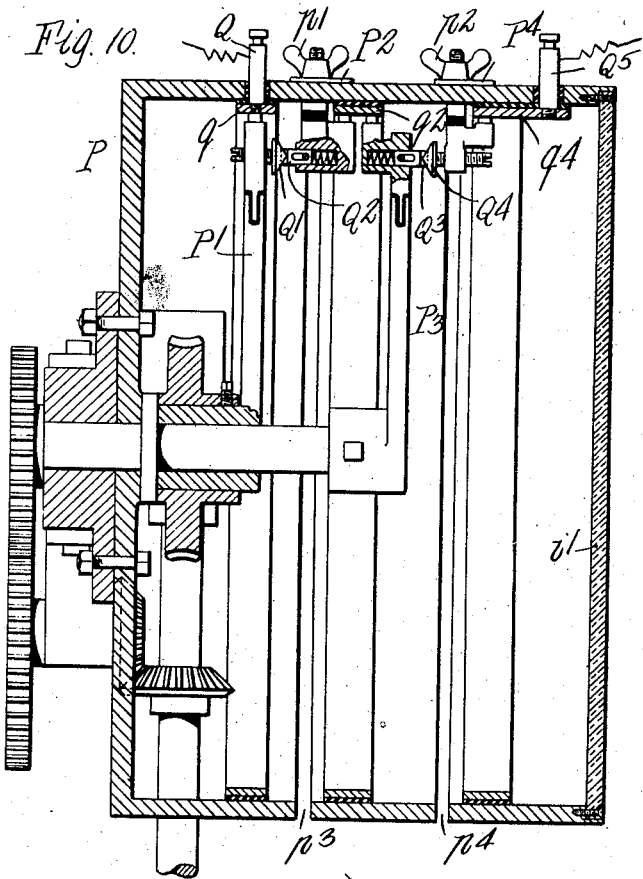
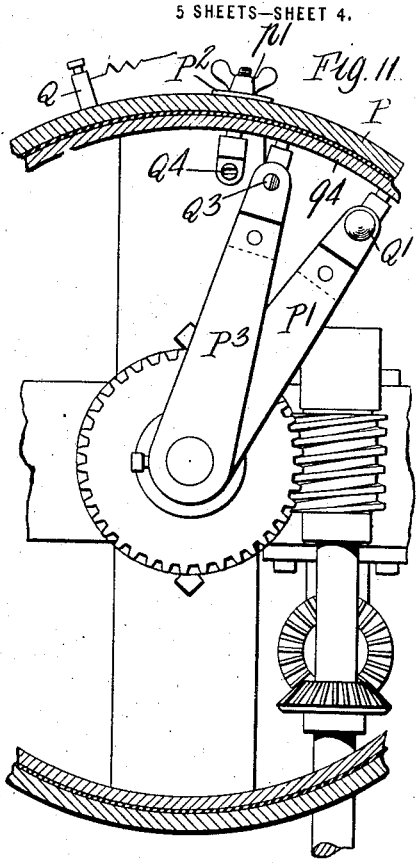
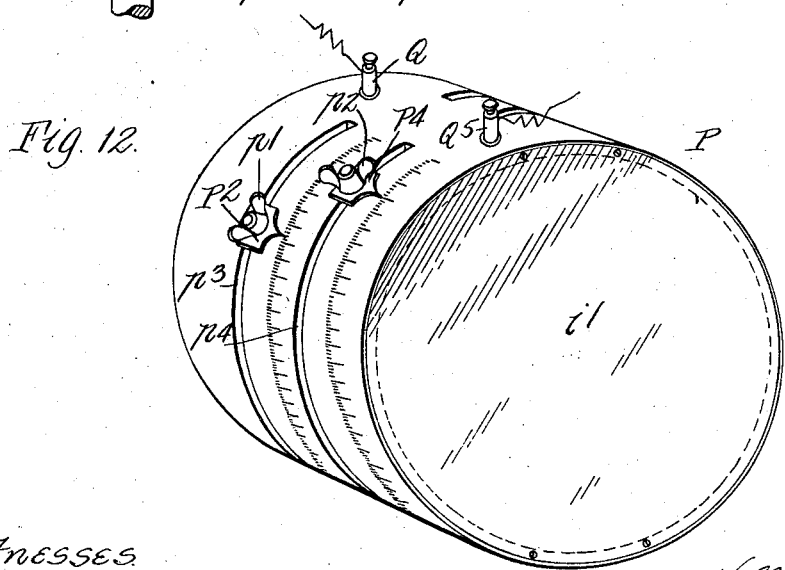
Witnesses
Inventor
William C. Huebner
By Wilhelm, Parker & Hand
Attorneys.

W. C. HUEBNER.
ADJUSTMENT INDICATOR AND CONTROLLER.
APPLICATION FILED APR. 7, 1911.
1,170,157.
Patented Feb. 1, 1916.
5 SHEETS—SHEET 5.
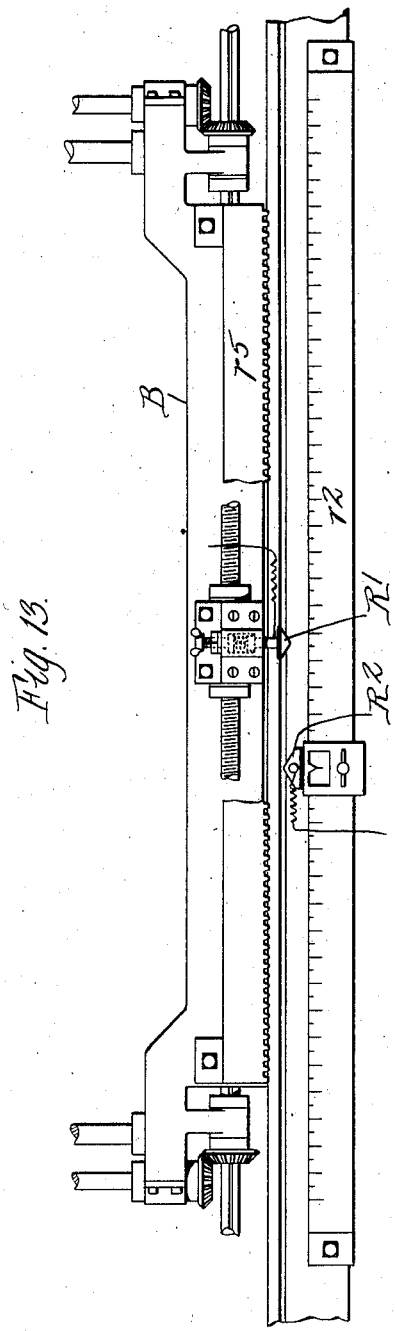
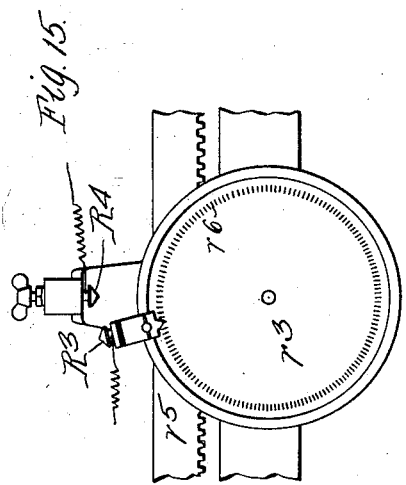
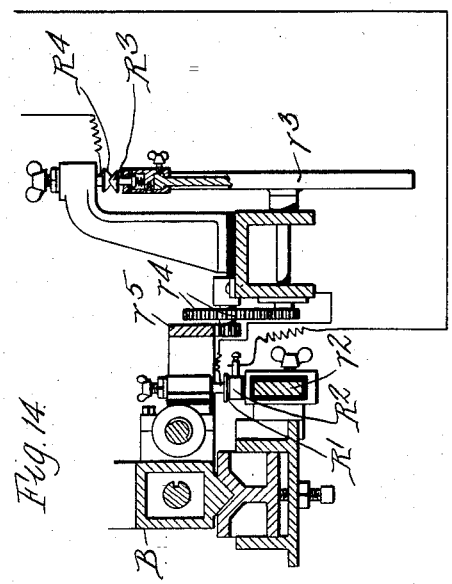

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

ADJUSTMENT INDICATOR AND CONTROLLER.

1,170,157.　　　　　　　Specification of Letters Patent.　　　Patented Feb. 1, 1916.

Application filed April 7, 1911. Serial No. 619,560.

*To all whom it may concern:*

Be it known that I, WILLIAM C. HUEBNER, a citizen of the United States, residing at Buffalo, in the county of Erie and State of New York, have invented a new and useful Improvement in Adjustment Indicators and Controllers, of which the following is a specification.

This invention relates to a mechanism for controlling with great precision and accuracy the adjustment of parts of various kinds of machines which require a very accurate adjustment, for instance, the light box for the transparent positive or negative and the holder for the sensitized plate or stone in photographic printing machines, or the matrix holder and the impression mechanism of a matrix-making machine.

The object of the invention is to produce a simple, reliable and convenient mechanism which enables the adjusting movement of such and other adjustable machine parts to be arrested when the desired position has been reached. When the adjusting movement is effected by power the mechanism comprises preferably a clutch which connects the power with the adjusting mechanism, an electric switch for throwing the clutch into action, a controller which is set in accordance with the desired adjustment of the adjustable part, and mechanism which is controlled by the controller and acts automatically to throw the clutch out of action and stop the adjusting movement when the adjustable part reaches the desired position.

The adjustment controller comprises two sets of wheels or members, one set which is stationary during the adjusting movement but adjustable and is set to correspond with the desired adjustment of the adjustable part, and another set of which the wheels or members are driven in unison with the adjustable part so that the adjusting movement of such part is reproduced or represented by the movement of these driven wheels or members. Each set comprises a unit wheel or member and a fraction wheel or member. The divisions, whether inches or centimeters, are marked on appropriate scales. The driven wheels or members are so connected with the adjusting mechanism that the unit wheel or member is driven a distance equal to one of the unit divisions of the unit scale for each unit of travel of the adjustable part, and the fraction member or wheel is driven the full length of a fraction scale which represents one unit of the unit scale. When the adjustable wheels or members of the controller have been set for a desired adjustment and the adjusting mechanism has been started by closing the switch, the movement of the adjusting mechanism will continue until the driven members of the controller reach positions which coincide with the positions of the stationary adjustable members. When the two sets of wheels or members so coincide, electrical contacts are automatically connected and the clutch is thrown out of action, thereby stopping the movement of the adjusting mechanism.

In the accompanying drawings: Figure 1 is a fragmentary elevation of a matrix machine in which the adjustment of the carriage is controlled by means of this invention. Fig. 1ᵃ is a top plan view of the driving clutches and connecting parts. Fig. 2 is a front elevation, partly in section, on an enlarged scale, of one of the adjustment indicators and controllers of the machine. Fig. 3 is a transverse sectional elevation thereof on line 3—3, Fig. 4. Fig. 4 is a longitudinal sectional elevation thereof and a diagram of the electrical devices controlled thereby. Fig. 5 is a side elevation of the controller, the casing thereof being omitted. Fig. 6 is a fragmentary longitudinal section thereof on a larger scale. Fig. 7 is a sectional plan of the controller gearing. Fig. 8 is an enlarged section of one of the controller contacts. Fig. 9 is a detached view of one of the contact points. Fig. 10 is a longitudinal sectional elevation of a controller of modified construction. Fig. 11 is a broken transverse section thereof. Fig. 12 is a perspective view thereof, on a reduced scale. Fig. 13 is a fragmentary elevation of a machine provided with an adjustment indicator and controller of another construction. Fig. 14 is a transverse sectional elevation thereof. Fig. 15 is a front elevation thereof.

Like reference characters refer to like parts in the several figures.

Referring first to Fig. 1, which illustrates the invention applied to the control of the adjustable parts of a matrix-making machine, A represents the stationary frame of the machine, B a carriage which is adjustably mounted in the frame to slide horizontally on tracks $b$ $b'$, and C a frame or holder which is adjustable vertically on the side bars of the carriage. The holder is of suitable construction for supporting the plastic matrix plate $c$ in operative relation with the printing form (not shown). By adjusting the carriage B horizontally and the holder C vertically relative to the printing form, the impressions can be made in any required position on the matrix plate.

The carriage B is adjusted horizontally by suitable mechanism, consisting, for instance, of a screw D which is connected by bevel gears $d$ to the driven member of a clutch E. The other member of the clutch is driven by gears $e$ $e'$ from a main drive shaft F. The adjusting screw D is set in motion for adjusting the carriage B and is stopped by the clutch E. The clutch may be of any suitable construction but is preferably an electrical clutch in which the driven member is started and stopped by closing and opening an electric circuit.

The holder C is adjusted vertically in the carriage by suitable mechanism, for instance, by screws $g$ $g$, each connected by bevel gears $h$ $h'$ to an adjusting shaft H on which the bevel gears $h'$ are splined to permit of the horizontal adjustment of the carriage. The shaft H is geared to the driven member of another clutch E', like the clutch E, which has a driving member geared to and driven by the drive shaft F by gears $e^2$ $e^3$, Fig. 1$^a$.

I represents the adjustment controller and indicator for regulating the horizontal adjustment of the carriage B. Adjustment controllers of several different constructions but operating on the same principle are disclosed in the drawings.

In the construction shown in Figs. 1–9, $i$ represents the controller casing, which is preferably provided with a glass face plate $i'$ and with hinged side portons $i^2$ which can be opened to afford access to the controlling mechanism. K' K$^2$ K$^3$ K$^4$ represent four wheels or members of which the wheels K' K$^3$ are driven in unison with the adjusting mechanism and K$^2$ K$^4$ are adjustable but stationary during the adjusting movement. These wheels are journaled concentrically one within the other on a supporting stud $k$ in the casing $i$. The circular rims of these wheels are located just in rear of the face plate of the casing where they can be readily seen. Pointers $k'$ $k^2$ are provided on the front faces of the wheels K' K$^2$, respectively, which coöperate with a stationary scale $k^5$ which surrounds the wheel K$^2$ and may be formed on or secured to the face plate. Pointers $k^3$ $k^4$ are also provided on the wheels K$^3$ K$^4$, respectively, which coöperate with a stationary scale $k^6$ surrounding the wheel K$^4$. The scale $k^5$ has equal divisions representing inches, centimeters or other units of measure which the carriage B travels horizontally, while the other scale $k^6$ has divisions indicating small fractions of the units represented by the first scale. For example, the divisions of this scale may indicate two-hundredths of an inch. The wheels K' and K$^3$ are geared to the adjusting mechanism of the carriage so that the unit wheel K' is turned a distance equal to one of the unit divisions of the scale $k^5$ during a corresponding travel of the carriage, and the fraction wheel K$^3$ is turned one complete revolution for each unit movement of the unit wheel K'. The gearing shown for this purpose, Figs. 5 and 7, consists of a gear rim $k^7$ secured to the hub of the fraction wheel K$^3$ and meshing with a pinion $k^8$ on a horizontal shaft $k^9$, and a gear rim $k^{10}$ secured to the hub of the unit wheel K' and meshing with a worm $k^{11}$ on a shaft $k^{12}$ which is connected by bevel gears $k^{13}$ to the horizontal shaft $k^9$. This shaft is connected by bevel gears $k^{14}$ to an upright shaft $k^{15}$ which is driven by bevel gears $k^{16}$ from the adjusting screw D. Any other suitable mechanism for driving the wheels K' and K$^3$ differentially, as explained, from the adjusting mechanism of the carriage could be employed. The two stationary but adjustable wheels K$^2$ and K$^4$ can be independently set or adjusted to any desired position, for instance, by gear rims $l^2$ and $l^4$ secured respectively to the hubs of the wheels K$^2$ and K$^4$ and meshing with pinions $l'$ and $l^3$ on adjusting shafts $l^5$ $l^6$ which are provided with hand wheels $l^7$ $l^8$ for turning them. M, Figs. 4 and 6, represents a contact device secured to the controller casing and having a wheel $m^8$ or part bearing against a conducting ring $m$ which is secured to and insulated from the gear rim of the driven unit wheel K'. A contact M' secured to this ring is adapted to engage a coöperating contact M$^2$ carried by a conducting ring $m^2$ which is secured to and insulated from the gear rim of the adjustable unit wheel K$^2$. This ring $m^2$ revolves in engagement with a contact M$^3$ which is carried by and insulated from the gear rim of the driven fraction wheel K$^3$. The contact M$^3$ is adapted to engage a contact M$^4$ carried by a conducting ring $m^4$ which is secured to and insulated from the gear rim of the adjustable fraction wheel K$^4$. A stationary contact device M$^5$ on the casing $i$ has a wheel $m^9$ or other suitable part bearing against this conducting ring $m^4$. Preferably the contacts M' and M$^4$ have screw shanks $m^{10}$ $m^{11}$, respectively, Fig. 6, working in nuts $m^{12}$ $m^{13}$, respectively, on their supporting rings and are adapted to be turned to adjust them toward and from the coöperating contacts M$^2$ and M$^3$, while the contacts M$^2$ and M$^3$ have spring-pressed wedge-shaped points $m^6$ adapted to engage the conical inner ends of the adjustable contacts M' M$^4$, Figs. 6, 8 and 9. The contact $M^3$ also has a spring-pressed block $m^7$ which slides on the face of the ring $m^2$. In the use of the controller, the adjustable unit and fraction wheels or members $K^2$ and $K^4$ are set by turning them so as to place their pointers opposite the numbers on the scales $k^5$ and $k^6$ representing in inches or other units of measure and fractions thereof, the desired adjustment of the carriage B. The adjusting mechanism of the carriage is then set in operation by closing the circuit of its driving clutch E, as hereinafter explained. When the carriage has traveled to the position indicated by the adjustment of the adjusted stationary wheels $K^2$ and $K^4$, the contacts $M'$ and $M^3$ carried by the driven wheels $K'$ and $K^3$, which rotate in unison with the adjusting movement of the carriage, will be brought into engagement with the coöperating contacts $M^2$ and $M^4$ carried by the adjustable unit and fraction wheels $K^2$ and $K^4$ thus placing the stationary contact devices M and $M^5$ in electrical connection. Any suitable means operated by the controller I when the contacts M and $M^5$ thereof are placed in electrical connection, can be used for stopping the adjusting mechanism of the carriage. As shown in Fig. 4, the clutch E is connected in an operating circuit $n$ $n'$ provided with a switch N adapted to be moved by hand to close the circuit for starting the clutch and to be opened by a solenoid $n^2$. The terminals of the solenoid winding are connected, respectively, to one side, $n$, of the clutch circuit and to the contact $M^5$ of the adjustment controller, while the other contact M of the controller is connected by a conductor $n^3$ to the other side of said circuit. Consequently, when the contacts M and $M^5$ are electrically connected by the operation of the controller, the solenoid $n^2$ will be energized and will move the switch N to open the clutch circuit and stop the clutch driven mechanism. O represents an adjustment controller similar to that described which operates in the same manner to automatically control the operation of the clutch-driven adjusting mechanism for the holder driven adjusting mechanism for the holder C.

In the modified construction of the controller shown in Figs. 10-12, P represents the controller casing and $P'$ and $P^3$ represent respectively, the driven unit and fraction members which consist of rotating arms driven at differential speeds by suitable gearing connecting them with the clutch-driven adjusting mechanism. $P^2$ and $P^4$ represent respectively, the adjustable unit and fraction members which consist of pointers coöperating with appropriate scales on the controller casing and are provided with clamp nuts $p'$ $p^2$ for securing them in adjusted positions in slots $p^3$ $p^4$ in the controller casing. The driven members are provided with contacts $Q'$ $Q^3$, respectively, and the adjustable members are provided with contacts $Q^2$ $Q^4$, respectively. The contact $Q'$ travels in contact with a conducting ring $q$ connected to a stationary contact device Q on the casing and is adapted to engage the adjustable contact $Q^2$. The latter and the driven contact $Q^3$ bear against a conducting ring $q^2$ and the contact $Q^3$ is adapted to engage the other adjustable contact $Q^4$ which bears against a conducting ring $q^4$ connected to a stationary contact device $Q^5$ on the casing. The contacts $Q^2$ and $Q^4$ are set to indicate the desired adjustment of the carriage, and when the driven contacts $Q'$ and $Q^3$ have been moved by the adjusting mechanism into engagement with the contacts $Q^2$ and $Q^4$ they will place the stationary contact devices Q and $Q^5$ in electrical connection, which will stop the clutch-driven adjusting mechanism in the manner before described in connection with the controller I.

In the modified construction shown in Figs. 13-15, the driven unit member is secured directly to and travels with the adjustable carriage B and carries a contact $R'$ which is adapted to engage the contact $R^2$ of the adjustable unit member. This member is adjustable on a unit scale bar $r^2$ secured to the stationary frame of the machine. The driven fraction member consists of a wheel $r^3$ which is provided with a contact $R^3$ and is driven at the proper speed by gears $r^4$ connecting it with a toothed rack $r^5$ on the carriage B. The contact $R^3$ is adapted to be adjusted to the correct fractional position on this wheel by reference to a fraction scale $r^6$ on the wheel. This contact $R^3$ is adapted to engage a fixed contact $R^4$. The contacts $R^2$ and $R^4$ are connected to a device for opening the circuit of the driving clutch of the adjusting mechanism. The contacts $R^2$ and $R^3$ are adjusted to indicate, in inches or other units, and fractions thereof, the desired adjustment, and when the contacts $R'$ and $R^3$ engage the contacts $R^2$ and $R^4$ the latter will be electrically connected and will operate to stop the clutch-driven adjusting mechanism in the manner before described.

It will be evident from the three constructions of the adjustment indicator and controller described that the controllers can be constructed in different ways and still operate on the same principle to insure the adjustment of an adjustable part or device accurately to a very small fractional part of an inch or other unit of measure. By constructing the controller on the described principle, with the separate adjustable and driven unit and fraction members, a fraction scale with large divisions can be used and this enables the adjustable members to be set quickly and easily and still insure an extremely accurate adjustment.

While the device is preferably used as an automatic controller in the manner explained, it can also be used without automatic controlling mechanism, in which case the device indicates to the operator of the machine when the desired adjustment has been reached but does not automatically stop the adjusting movement. When the device is used without this automatic mechanism, the adjustable unit and fraction wheels or members are set to correspond with the desired adjustment of the movable part of the machine, the adjusting mechanism of such movable part is operated by hand or power, and the driven unit and fraction wheels or members are actuated in unison with the adjustable part, as described, and indicate to the operator, by their movement and by comparison with the adjustable but stationary members or wheels, when the adjusting movement has placed the adjustable machine part in the desired position. When this position has been reached the driven unit and fraction wheels or members coincide exactly with the adjusted position of the adjustable unit and fraction wheels or members and the operator stops the adjusting movement.

I claim as my invention:

1. The combination with an adjustable machine part and its adjusting mechanism, of an adjustment controller comprising adjustable unit and fraction members which are set to correspond to the desired adjustment of the adjustable machine part and are stationary during the adjusting movement of said part, and driven unit and fraction members which move differentially and in unison with said adjustable part during the adjusting movement thereof and which indicate by comparison with the stationary members the position of the adjustable machine part, substantially as set forth.

2. The combination with an adjustable machine part and its adjusting mechanism, of an adjustment controller comprising adjustable unit and fraction members which are set to correspond to the desired adjustment of the adjustable machine part and are stationary during the adjusting movement of said part, and driven unit and fraction members which move differentially and in unison with said adjustable part during the adjusting movements thereof, and automatic mechanism which operates to stop the adjusting movement when the driven unit and fraction members arrive at positions which correspond to the positions of the adjustable unit and fraction members, substantially as set forth.

3. The combination with an adjustable machine part and its adjusting mechanism, of an adjustment controller comprising unit and fraction members capable of rotary adjustment, which members are set to correspond to the desired adjustment and remain stationary during the adjusting movement of said part, and rotary unit and fraction members which move differentially and in unison with said adjustable part during the adjusting movement thereof, substantially as set forth.

4. An adjustment controller for stopping the movement of an adjustable part comprising unit and fraction members capable of rotary adjustment, which members are set to correspond to the desired adjustment and remain stationary during the adjusting movement of said part, and rotary unit and fraction members which move differentially and in unison with said adjustable part during the adjusting movement thereof, and automatic mechanism which operates to stop the adjusting movement when the driven unit and fraction members arrive at positions which correspond to the positions of the adjustable unit and fraction members, substantially as set forth.

5. The combination with an adjustable machine part, its adjusting mechanism, and an electrical clutch for driving the same, of an adjustment controller comprising adjustable unit and fraction members which are set to correspond to the desired adjustment and driven unit and fraction members which move differentially in unison with said adjustable part, electrical contacts which are automatically connected when said driven unit and fraction members arrive in positions corresponding to the adjusted positions of said adjustable members, and electrical mechanism connected with said contacts and operating said clutch to stop the movement of said adjusting mechanism when said contacts are connected, substantially as set forth.

6. A controller for stopping the movement of an adjustable part comprising adjustable unit and fraction wheels which are set to correspond to the desired adjustment of the adjustable machine part and are stationary during the adjusting movement of said part, and driven unit and fraction wheels which move differentially and in unison with said adjustable part during the adjusting movement thereof, said adjustable and driven wheels being arranged concentrically and approximately in the same plane, substantially as set forth.

7. A controller for stopping the movement of an adjustable part comprising a driven unit wheel, an adjustable unit wheel surrounding the same, a stationary unit scale concentric with said wheels, a driven fraction wheel surrounding said unit wheels, an adjustable fraction wheel surrounding said driven fraction wheel, and a stationary fraction scale concentric with said wheels, substantially as set forth.

8. An adjustment controller for stopping the movement of an adjustable part comprising units and fractions members which are adapted to be adjusted to predetermine the movement in units of measure and fractions thereof of said adjustable part, a driven units member which moves a unitary distance during each unit of travel of said adjustable part, and a driven fractions member which revolves once during each unit of travel of said adjustable part, and means which operate to stop said adjusting means when said driven units and fractions members arrive at positions corresponding respectively to the adjusted positions of said adjustable units and fractions members, substantially as set forth.

Witness my hand, this 30th day of March, 1911.

WILLIAM C. HUEBNER.

Witnesses:
C. W. PARKER,
C. B. HORNBECK.